United States Patent
Kim et al.

(10) Patent No.: US 8,345,829 B2
(45) Date of Patent: Jan. 1, 2013

(54) AUTHENTICATION OF A USER TO A TELEPHONIC COMMUNICATION DEVICE

(75) Inventors: Moon J. Kim, Wappingers Fall, NY (US); Jang-Soo Lee, Poughkeepsie, NY (US); Eric T. C. Yee, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 12/250,162

(22) Filed: Oct. 13, 2008

(65) Prior Publication Data

US 2010/0091953 A1      Apr. 15, 2010

(51) Int. Cl.
*H04M 1/64*      (2006.01)
(52) U.S. Cl. .................................. 379/88.02; 379/88.12
(58) Field of Classification Search .... 379/88.01–88.04; 704/270–278
See application file for complete search history.

(56) References Cited

U.S. PATENT DOCUMENTS

| | | | |
|---|---|---|---|
| 7,212,613 B2 * | 5/2007 | Kim et al. | 379/88.02 |
| 7,248,678 B2 | 7/2007 | Adams et al. | |
| 2004/0101112 A1 * | 5/2004 | Kuo | 379/88.01 |
| 2004/0193425 A1 | 9/2004 | Tomes | |
| 2007/0036289 A1 * | 2/2007 | Fu et al. | 379/88.02 |
| 2007/0270126 A1 | 11/2007 | Forbes et al. | |

* cited by examiner

*Primary Examiner* — Fan Tsang
*Assistant Examiner* — Van D Huynh
(74) *Attorney, Agent, or Firm* — John R. Pivnichny; Hoffman Warnick LLC

(57) ABSTRACT

The invention provides a method, system, and program product for authenticating a user to a telephonic communication device. In one embodiment, the invention includes obtaining a reference sample of an authorized user's voice, storing the reference sample of the authorized user's voice, collecting a sample of the voice of a user of the telephonic communication device, comparing the sample of the voice of the user to the reference sample of the authorized user's voice, determining whether the user is the authorized user, and in the case that the user is determined not to be the authorized user, prohibiting use of the telephonic communication device.

21 Claims, 6 Drawing Sheets

AUTHENTICATION OF A USER TO A TELEPHONIC COMMUNICATION DEVICE

TECHNICAL FIELD

The invention relates generally to telephonic communication and, more particularly, to the authentication of a user to a telephonic communication device.

BACKGROUND OF THE INVENTION

Today, many telephonic communication devices (e.g., telephones, cellular telephones, satellite telephones, etc.) include security features to restrict use of the device. This is particularly common in cellular and satellite telephones, which are more susceptible to loss. A typical security feature employed in such devices is the use of a multi-digit code to "unlock" the device and make its features available. Too often, however, such features are not enabled by a user because of the additional time and effort required. Even when such features are enabled, they are often easily bypassed. Thus, many telephonic communication devices are left vulnerable to unauthorized use due to the inconvenience to authorized users in employing known security features.

SUMMARY OF THE INVENTION

The invention provides a method, system, and program product for authenticating a user to a telephonic communication device.

A first aspect of the invention provides a method of authenticating a user to a telephonic communication device, the method comprising: obtaining a reference sample of an authorized user's voice; storing the reference sample of the authorized user's voice; collecting a sample of the voice of a user of the telephonic communication device; comparing the sample of the voice of the user to the reference sample of the authorized user's voice; determining whether the user is the authorized user; and in the case that the user is determined not to be the authorized user, prohibiting use of the telephonic communication device.

A second aspect of the invention provides a system for authenticating a user to a telephonic communication device, the system comprising: a system for obtaining a reference sample of an authorized user's voice; a system for storing the reference sample of the authorized user's voice; a system for collecting a sample of the voice of a user of the telephonic communication device; a system for comparing the sample of the voice of the user to the reference sample of the authorized user's voice; a system for determining whether the user is the authorized user; and a system for prohibiting use of the telephonic communication device.

A third aspect of the invention provides a program product stored on a computer-readable medium, which when executed, authenticates a user to a telephonic communication device, the program product comprising: program code for obtaining a reference sample of an authorized user's voice; program code for storing the reference sample of the authorized user's voice; program code for collecting a sample of the voice of a user of the telephonic communication device; program code for comparing the sample of the voice of the user to the reference sample of the authorized user's voice; program code for determining whether the user is the authorized user; and program code for prohibiting use of the telephonic communication device.

A fourth aspect of the invention provides a method for deploying an application for authenticating a user to a telephonic communication device, comprising: providing a computer infrastructure being operable to: obtain a reference sample of an authorized user's voice; store the reference sample of the authorized user's voice; collect a sample of the voice of a user of the telephonic communication device; compare the sample of the voice of the user to the reference sample of the authorized user's voice; determine whether the user is the authorized user; and prohibit use of the telephonic communication device.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
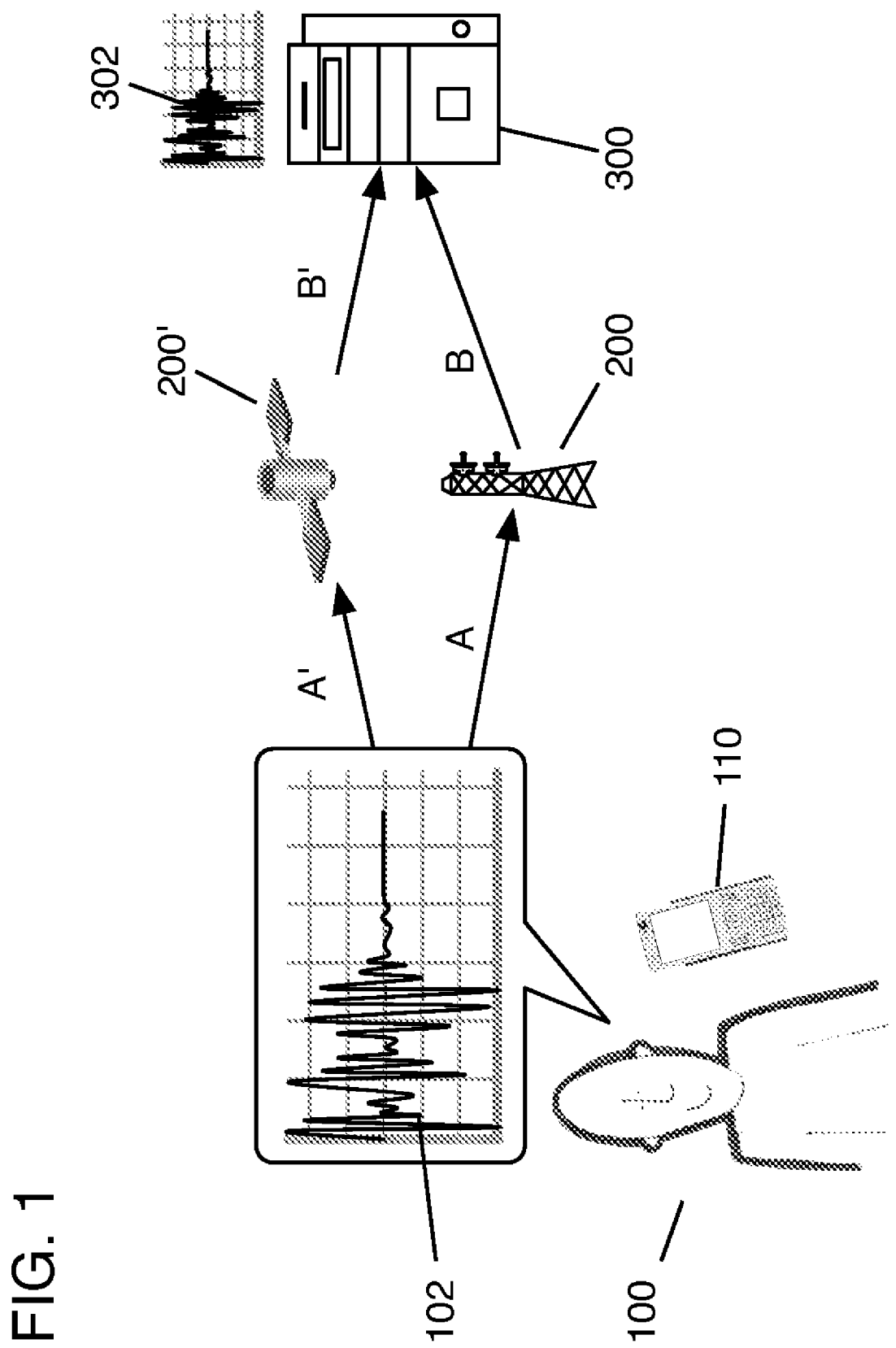
FIG. 1 shows the registration of a mobile telephone according to an embodiment of the invention.

Referring now to the drawings, FIG. 1 shows a user 100 registering his telephonic communication device (here, a mobile telephone 110). After providing a reference sample 102 of his voice, the reference sample 102 is transmitted A, A' using a communication system upon which the mobile telephone 110 will operate. Here, for purposes of illustration, transmission is shown via a cellular telephone system 200 and a satellite telephone system 200'. One skilled in the art will recognize that either, both, or other communication systems may be employed, depending on the type of telephonic communication device being registered.

The reference sample 102 is transferred to a storage device 300, where it resides as a stored reference sample 302 of the user's voice. As shown in FIG. 1, a single reference sample 102 is provided. In other embodiments, additional reference samples may be provided. In such an embodiment, these additional reference samples may be stored separately on the storage device 300 or may be used to update the stored reference sample 302 (i.e., the stored reference sample may be modified to reflect both the original reference sample 102 and any additional reference samples of the user's voice). The provision of additional reference samples may facilitate more accurate identification of the user 100 and authentication of the user 100 to the mobile telephone 110.

Figure 2:
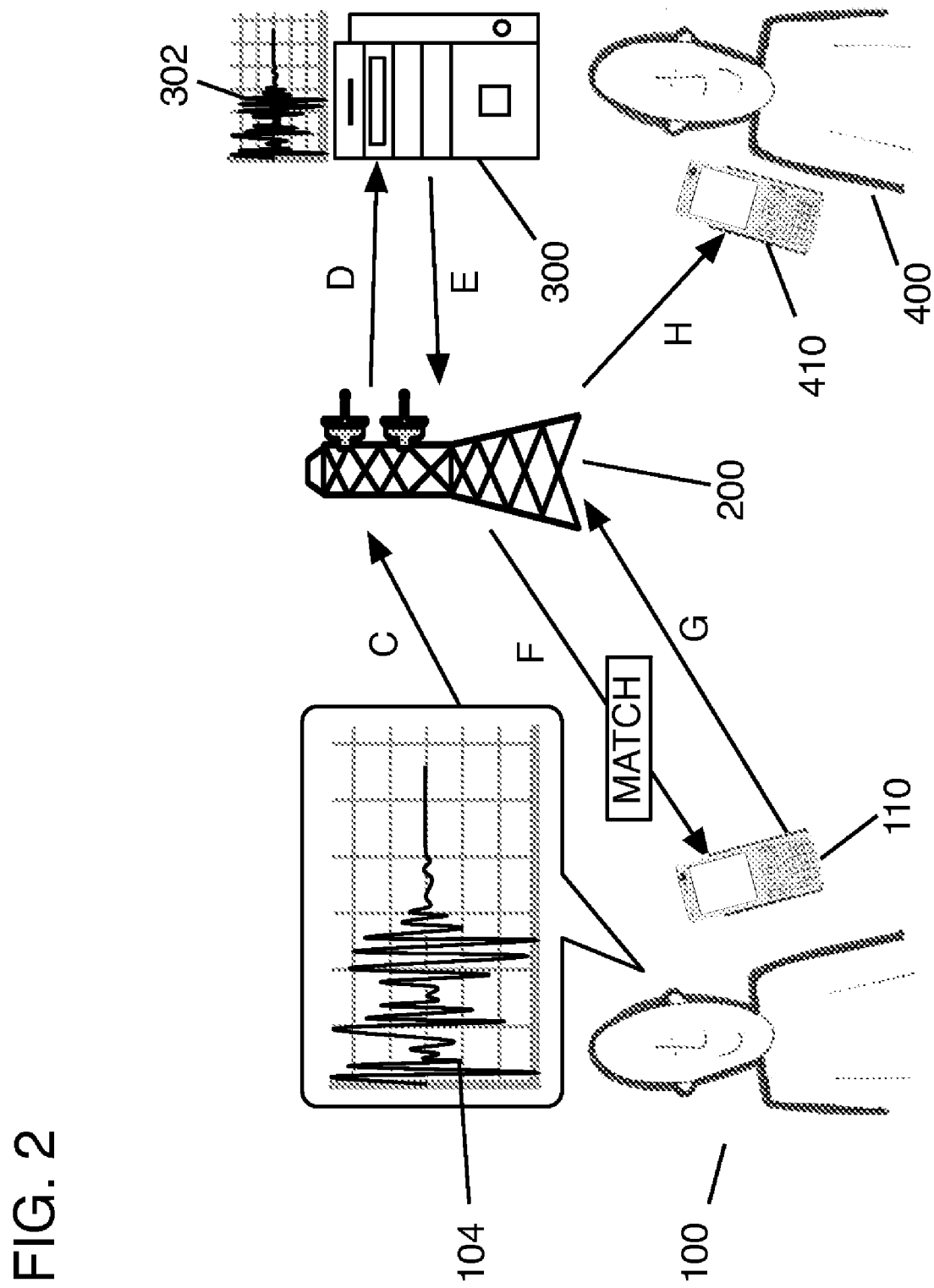
FIG. 2 shows the authentication of a user to the mobile telephone according to an embodiment of the invention.

In FIG. 2, a user 100 is shown using the mobile telephone 110 following the initial registration of FIG. 1. In using the mobile telephone 110, the user speaks into the mobile telephone 110, thus providing a sample 104 of his voice. This sample 104 is transmitted C via the applicable communication system (here, a cellular telephone system 200) and transferred D to the storage device 300, upon which the stored reference sample 302 resides.

A comparison is made between the sample 104 of the user's voice and the stored reference sample 302 and a determination is made as to whether the two "match" (i.e., it is determined whether the user 100 providing the sample 104 had also provided the stored reference sample 302). As used herein, the term "match" does not require that the sample 104 and stored reference sample 302 are identical. In practice, they almost certainly will not be. Rather, the term "match" means that an algorithm or other method of comparison is made in order to determine whether the two samples are likely to have had a common origin. Various levels of stringency may be defined for such comparisons and, in some cases, may be user-defined.

It should be recognized, of course, that the comparison may be made using any number of voice comparison or authentication systems. A suitable voice authentication system is described in U.S. Pat. No. 7,212,613, which is incorporated herein as though fully set forth. It should also be recognized that the comparison of the sample 104 may be performed by a voice comparison or authentication system that includes or is separate from the storage device 300 containing the stored reference sample 302.

The results of the comparison are transmitted E via the cellular telephone system 200 and transferred F to the mobile telephone 110. As shown in FIG. 2, the comparison resulted in a match between the sample 104 and the stored reference sample 302. As such, the mobile telephone 110 is granted continued access G to the cellular telephone system 200, enabling the user 100 to complete a call H to the mobile telephone 410 of a call recipient 400.

Figure 3:
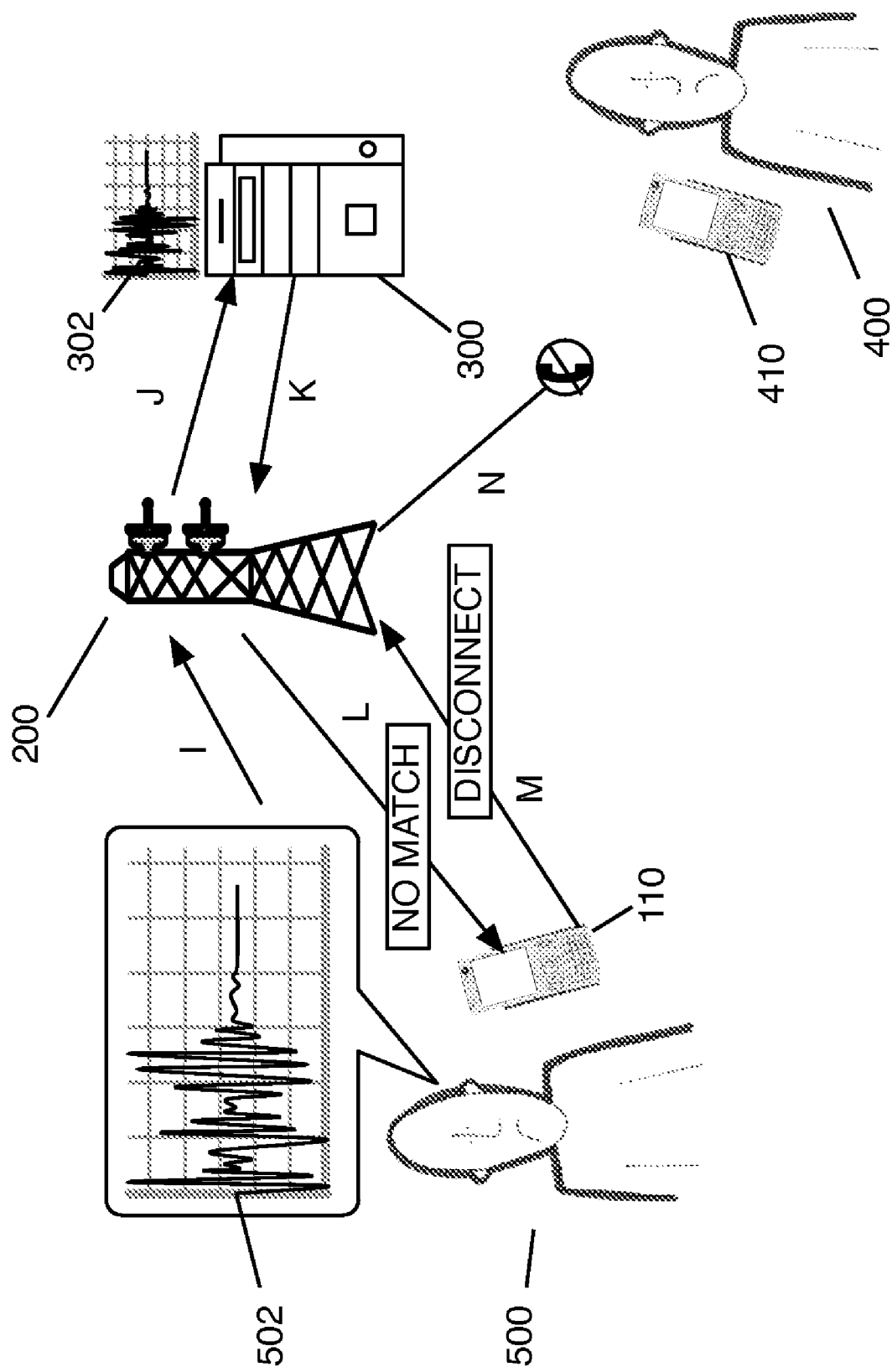
FIG. 3 shows the prohibiting of an unauthorized user from using the mobile telephone according to an embodiment of the invention.

In FIG. 3, I and J are analogous to C and D in FIG. 2. In FIG. 3, the comparison transmitted K via the cellular telephone system 200 and transferred L to the mobile telephone 110 indicates that the sample 502 of the unauthorized user 500 does not match the stored reference sample 302. As such, the call initiated by the unauthorized user 500 is disconnected M, resulting in termination of the call N to the mobile telephone 410 of the call recipient 400. In some embodiments of the invention, only the active call is terminated (i.e., the unauthorized user 500 or some other user may then immediately make another call and go through the same authentication procedure). In other embodiments, the mobile telephone 100 may be "locked" or rendered non-functional for an extended period. Such a period may be predefined (e.g., 30 minutes) or event-based (e.g., requiring an override using a security code or similar technique to render the mobile telephone 110 functional again).

Of course, it may be desirable, in some cases, for an authorized user (e.g., user 100) to permit an otherwise-unauthorized user (e.g., unauthorized user 500) to use his or her mobile telephone 110 or other telephonic communication device. In such a case, the user 100 may provide a voice sample 104, enter a security code 112, or both, either or both of which are then transmitted L via the cellular telephone system 200 and transferred J to the storage device 300 containing the stored reference sample 302, a stored security code, or both. As above, a comparison is made between the voice sample 104 and the stored reference sample 302 and/or the entered security code 112 and the stored security code. The result of this comparison is then transmitted K back via the cellular telephone system 200 and transferred L to the mobile telephone 110.

Figure 4:
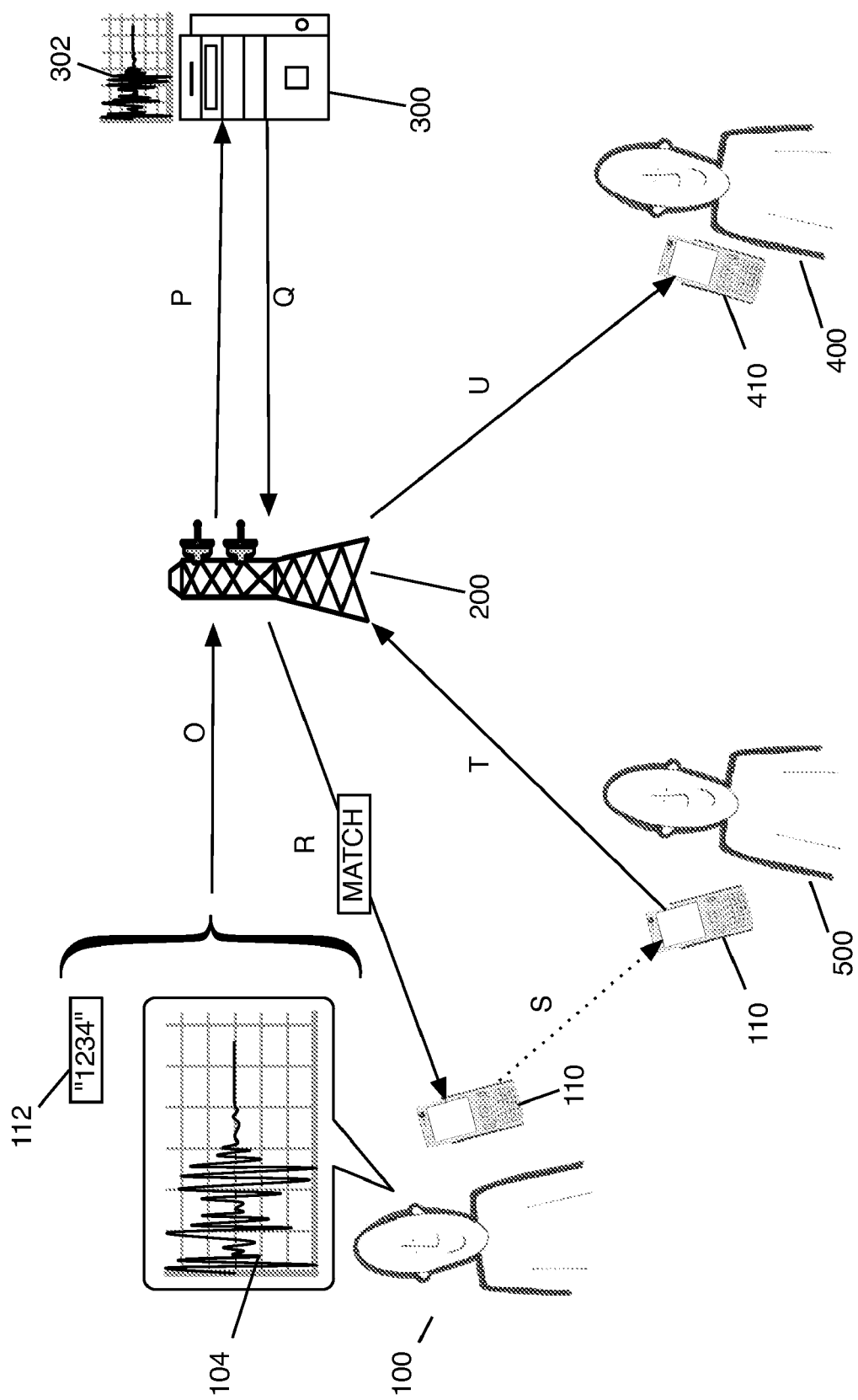
FIG. 4 shows an authorized user overriding the authentication process according to an embodiment of the invention.

In FIG. 4, O, P, Q, and R are analogous to C, D, E, and F in FIG. 2. As shown in FIG. 4, the comparison resulted in a match between the voice sample 104 and the stored reference sample and/or between the entered security code 112 and the stored security code. The user 100 may then provide S the mobile telephone 110 to the unauthorized user 500, whose voice is transmitted T via the cellular telephone system 200 during a call U to the mobile telephone 410 of a call recipient. While shown in FIGS. 2-4 as involving calls between mobile telephones, it should be recognized that the invention is applicable to the authentication of a user to any telephonic communication device and could facilitate communication between any combination of such devices (e.g., cellular telephone and satellite telephone, satellite telephone and landline telephone, etc.).

In each of the above examples, authentication of a user is shown as occurring once, early in the user's use of the mobile telephone. However, the invention also includes periodic or continuous authentication of a user. For example, in some embodiments, the invention includes authenticating the user every 60 seconds or some other applicable period. In other embodiments, authentication is continuous (i.e., the user's voice is continuously sampled and compared to the stored reference sample). In some embodiments where periodic or continuous authentication is employed, a call is terminated upon any authentication failure. In other embodiments, a call may be terminated following a predetermined number of authentication failures or following a predetermined number of successive authentication failures. Such embodiments may be helpful, for example, where the stored reference sample 302 is not updated, as described above, and the likelihood of spurious authentication failure is necessarily greater.

Figure 5:
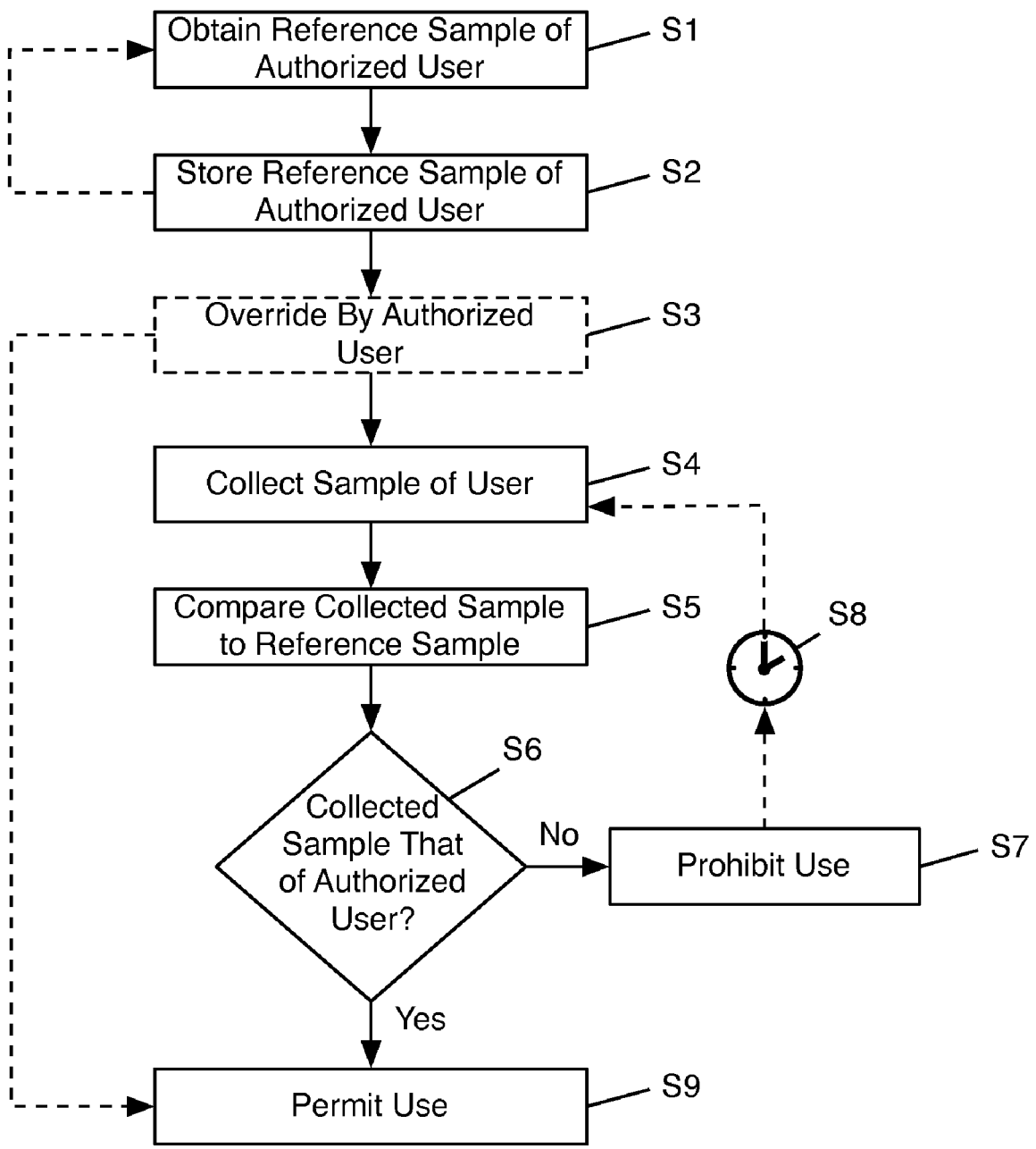
FIG. 5 shows a flow diagram of an illustrative method according to the invention.

FIG. 5 shows a flow diagram of an illustrative method according to an embodiment of the invention. At S1, a reference sample of an authorized user (e.g., the purchaser of the telephonic communication device) is obtained (e.g., recorded from an input portion of the device). In some cases, it may be desirable to have the authorized user read a pre-determined script in order to standardize and improve the accuracy of the authentication system employed.

At S2, the reference sample is stored for future comparisons and authentication. As noted above, S1 and S2 may be iteratively looped to provide a more accurate reference sample.

At S3, an authorized user may optionally override the authentication process, such that use of the device is then permitted at S9. If no override is made at S3, a sample of a user's voice is collected at S4 and, at S5, compared to the reference sample stored at S2.

At S6, it is determined whether the sample collected at S4 "matches" the reference sample stored at S2. As noted above, the term "match" is not meant to suggest that the samples need be identical. If the samples "match," i.e., "Yes" at S6, use of the device is permitted at S9. If the samples do not match, i.e., "No" at S6, use of the device is prohibited at S7. As explained above, such prohibition may simply include termination of a extant call. Alternatively, the device may be rendered non-functional for a period S8 or until some other event occurs, at which point a voice sample may be again collected at S4.

Figure 6:
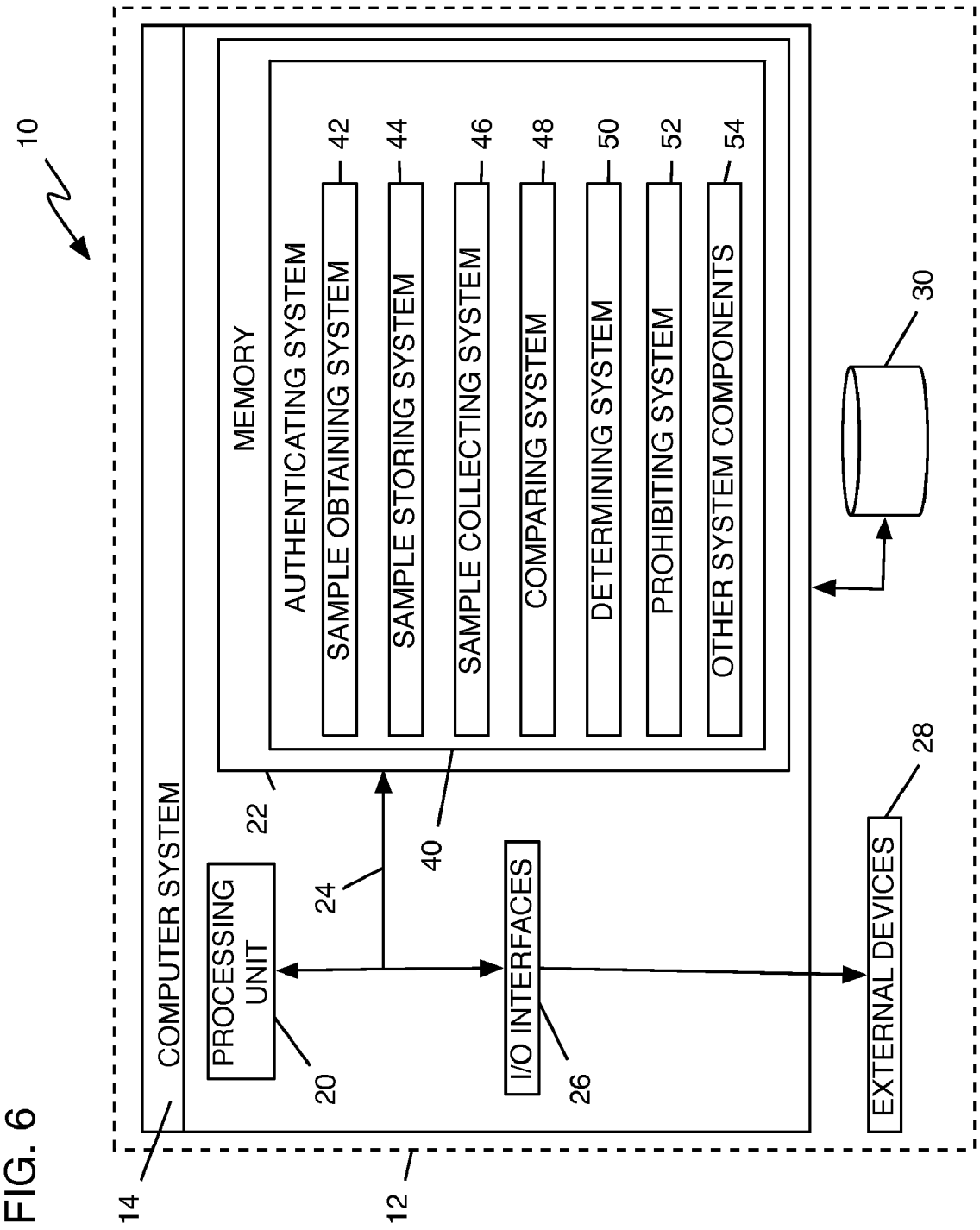
FIG. 6 shows a block diagram of an illustrative system according to the invention.

FIG. 6 shows an illustrative system 10 for authenticating a user to a telephonic communication device. To this extent, system 10 includes a computer infrastructure 12 that can perform the various process steps described herein for authenticating a user to a telephonic communication device. In particular, computer infrastructure 12 is shown including a computer system 14 that comprises an authenticating system 40, which enables computer system 14 to authenticate a user to a telephonic communication device by performing the process steps of the invention.

Computer system 14 is shown including a processing unit 20, a memory 22, input/output (I/O) interfaces 26, and a bus 24. Further, computer system 14 is shown in communication with external devices 28 and a storage system 30. As is known in the art, in general, processing unit 20 executes computer program code, such as communication authenticating system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and communication authenticating system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, the authenticating system 40 enables the computer system 14 to authenticate a user to a telephonic communication device. To this extent, the authenticating system 40 is shown including a sample obtaining system 42, a sample storing system 44, a sample collecting system 46, a comparing system 48, a determining system 50, and a prohibiting system 52. Operation of each of these systems is discussed above. The authenticating system 40 may further include other system components 54 to provide additional or improved functionality to the authenticating system 40. It is understood that some of the various systems shown in FIG. 6 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for authenticating a user to a telephonic communication device, it is understood that the invention further provides various alternative embodiments. For example, in one embodiment, the invention provides a computer-readable medium that includes computer program code to enable a computer infrastructure to authenticate a user to a telephonic communication device. To this extent, the computer-readable medium includes program code, such as authenticating system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to authenticate a user to a telephonic communication device, as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for authenticating a user to a telephonic communication device. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of authenticating comprising:
obtaining a reference sample of an authorized user;
storing the reference sample;
providing the authorized user an option to use a telephonic communication device immediately or collect an initial sample after said storing step;
collecting the initial sample of from a user of the telephonic communication device;
comparing the initial sample the user to the reference sample;
determining whether the user is the authorized user; and
in the case that the user is determined not to be the authorized user, prohibiting use of the telephonic communication device; and
determining whether to continue an activation of the telephonic communication device by:
collecting at least one subsequent sample of the user of the telephonic communication device;
comparing the at least one subsequent sample to the reference sample; and
prohibiting use of the telephonic communication device in response to the at least one subsequent sample not matching the reference sample.

2. The method of claim 1, further comprising:
in the case that the user is determined to be the authorized user, permitting use of the telephonic communication device.

3. The method of claim 1, further comprising:
obtaining additional reference samples of the authorized user; and
storing the additional reference samples.

4. The method of claim 3, wherein storing the additional reference samples includes revising the reference sample to include the additional reference samples.

5. The method of claim 1, wherein obtaining includes recording an input of the telephonic communication device.

6. The method of claim 1, wherein the reference sample includes the authorized user's reading of a pre-determined script.

7. The method of claim 1, wherein prohibiting includes terminating a communication using the telephonic communication device.

8. The method of claim 1, further comprising:
permitting an authorized user to override the prohibiting use of the telephonic communication device.

9. The method of claim 8, wherein overriding includes:
providing a sample of the authorized user.

10. The method of claim 9, wherein overriding further includes:
entering an override code using the telephonic communication device.

11. The method of claim 1, wherein the telephonic communication device is selected from a group consisting of: a cellular telephone and a satellite telephone.

12. The method of claim 1, wherein the determining whether to continue the activation of the telephonic communication device is performed at least one of periodically and continuously.

13. The method of claim 12, wherein periodically is taking the at least one subsequent sample after a determined time interval.

14. The method of claim 12, wherein continuously is taking the at least one subsequent sample each time the authorized user speaks.

15. A system for authenticating comprising:
a system for obtaining a reference sample of an authorized user;
a system for storing the reference sample;
a system for providing the authorized user an option to use a telephonic communication device immediately or collect an initial sample after said storing step;
a system for collecting the initial sample from a user of the telephonic communication device;
a system for comparing the initial sample to the reference sample;
a system for determining whether the user is the authorized user;
a system for prohibiting use of the telephonic communication device; and
a system for determining whether to continue an activation of the telephonic communication device by:
a system for collecting at least one subsequent sample of the user of the telephonic communication device;
a system for comparing the at least one subsequent sample to the reference sample; and
a system for prohibiting use of the telephonic communication device in response to the at least one subsequent sample not matching the reference sample.

16. A program product stored on a non-transitory computer-readable medium, which when executed, authenticates comprising:
program code for obtaining a reference sample of an authorized user;
program code for storing the reference sample;
program code for providing the authorized user an option to use a telephonic communication device immediately or collect an initial sample after said storing step;
program code for collecting the initial sample from a user of the telephonic communication device;
program code for comparing the initial sample to the reference sample;
program code for determining whether the user is the authorized user; and
program code for prohibiting use of the telephonic communication device;
program code for determining whether to continue an activation of the telephonic communication device by:
collecting at least one subsequent sample of the user of the telephonic communication device;
comparing the at least one subsequent sample to the reference sample; and
prohibiting use of the telephonic communication device in response to the at least one subsequent sample not matching the reference sample.

17. The program product of claim 16, further comprising:
program code for obtaining additional reference samples of the authorized user; and
program code for storing the additional reference samples.

18. The program product of claim 16, further comprising:
program code for overriding the prohibiting of use of the telephonic communication device.

19. A method for deploying an application for authenticating, comprising:
providing a computer infrastructure being operable to:
obtain a reference sample of an authorized user;
store the reference sample;

provide the authorized user an option to use a telephonic communication device immediately or collect an initial sample after said storing step;
collecting the initial sample from a user of the telephonic communication device;
comparing the initial sample to the reference sample;
determining whether the user is the authorized user; and
prohibiting use of the telephonic communication device;
determine whether to continue an activation of the telephonic communication device by:
collecting at least one subsequent sample of the user of the telephonic communication device;
comparing the at least one subsequent sample to the reference sample; and
prohibiting use of the telephonic communication device in response to the at least one subsequent sample not matching the reference sample.

20. The method of claim 19, wherein the computer infrastructure is further operable to:
obtain additional reference samples of the authorized user; and
store the additional reference samples.

21. The method of claim 19, wherein the computer infrastructure is further operable to:
override the prohibiting of use of the telephonic communication device.

* * * * *